Figure 1:
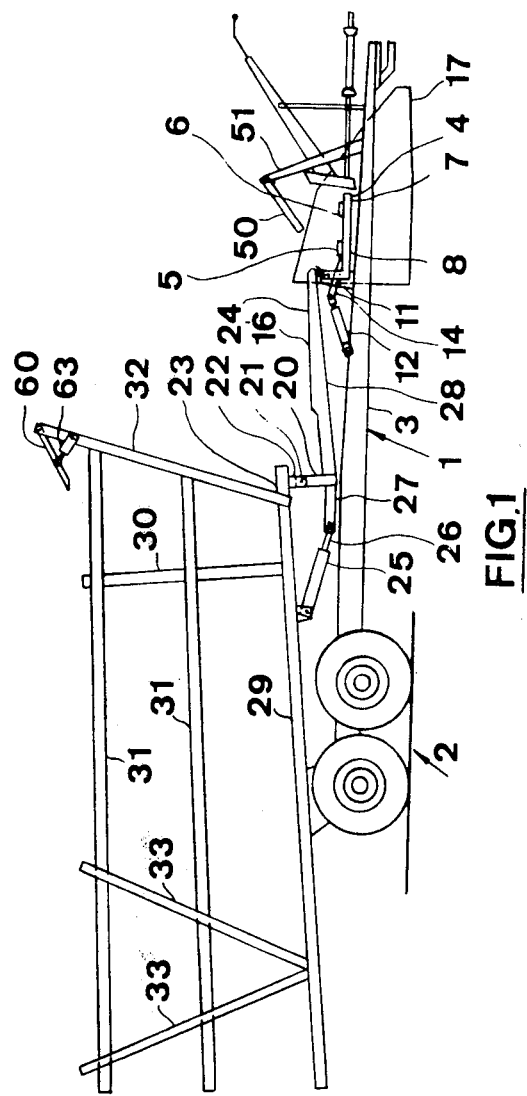

United States Patent [19]

Guenon et al.

[11] 4,119,218
[45] Oct. 10, 1978

[54] HILLSIDE BALE WAGON

[75] Inventors: Jean-Pierre Guenon, Plombieres-lez-Dijon; Serge J. C. Verdenne, Marcilly, Tille, both of France

[73] Assignee: Sperry Rand Corporation, New Holland, Pa.

[21] Appl. No.: 782,578

[22] Filed: Mar. 29, 1977

[30] Foreign Application Priority Data

Apr. 1, 1976 [GB] United Kingdom ............... 13223/76

[51] Int. Cl.² ...................... B65G 57/32; A01D 87/12
[52] U.S. Cl. ..................................... 214/6 B; 214/6 C
[58] Field of Search ....................... 214/6 B, 6 C, 7, 9, 214/144, 518; 56/473.5

[56] References Cited

U.S. PATENT DOCUMENTS

| | | | |
|---|---|---|---|
| 3,159,287 | 12/1964 | Stroup | 56/473.5 X |
| 3,289,859 | 12/1966 | Tarbox | 214/6 B |
| 3,414,139 | 12/1968 | Strommen | 214/6 B |
| 3,620,384 | 11/1971 | Welker | 214/6 B |
| 3,938,432 | 2/1976 | Jones | 214/6 B X |

FOREIGN PATENT DOCUMENTS

| | | | |
|---|---|---|---|
| 232,651 | 4/1969 | U.S.S.R. | 214/6 B |
| 445,396 | 6/1975 | U.S.S.R. | 214/6 B |

*Primary Examiner*—L. J. Paperner
*Attorney, Agent, or Firm*—John B. Mitchell; Frank A. Seemar; Ralph D'Alessandro

[57] ABSTRACT

The invention comprises improvements to an automatic bale wagon of the type having a transfer table and a load bed, the transfer table being arranged for receiving a tier of bales thereon and being pivotable between a bale-receiving position and a bale-unloading position in which latter position a tier of bales loaded thereon is transferred to the loadbed to form a stack of bales thereon comprising a plurality of tiers of bales. The invention enables the use of such a bale wagon in hillside conditions, and more especially on downward inclines in the longitudinal direction of the bale wagon without bales on the loadbed becoming disarranged. The improvements comprise retractable bale-retaining means operable to retain the forward most tier of bales in position on the loadbed by either acting on the front face of said tier or on the top layer of bales thereof and control means operable to automatically retract the bale-retaining means when a further tier of bales is transferred to the loadbed from the transfer table.

12 Claims, 16 Drawing Figures

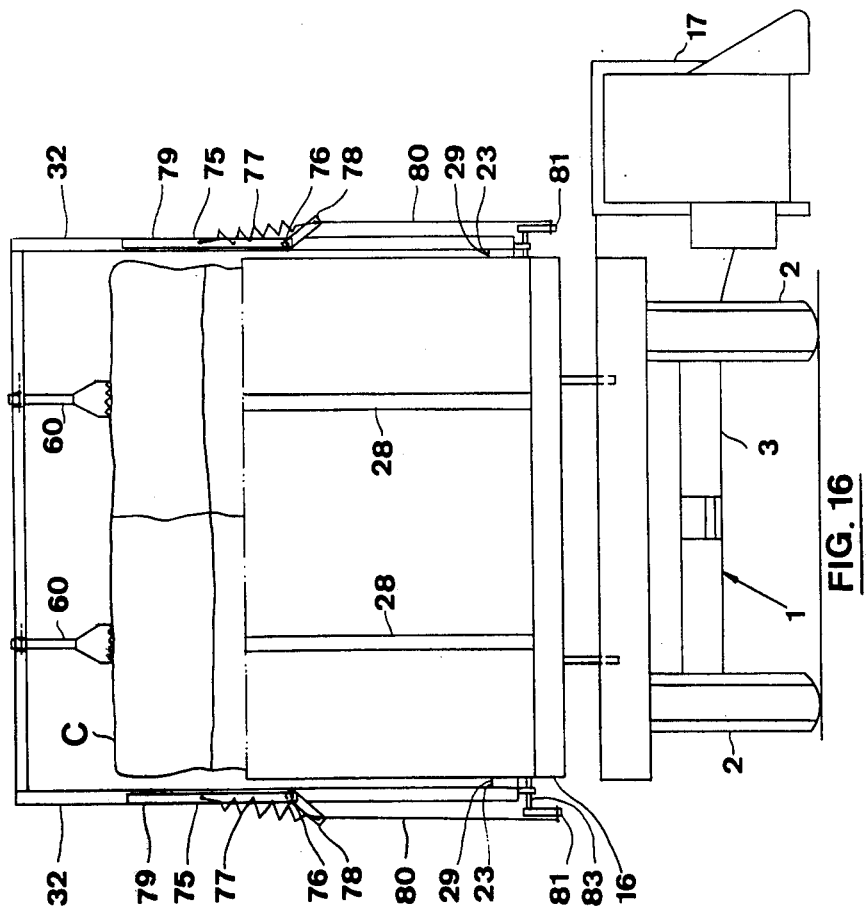

HILLSIDE BALE WAGON

BACKGROUND OF THE INVENTION

1. Field of the Invention

The present invention relates generally to agricultural equipment and more specifically to bale wagons.

2. Description of the Prior Art

With the trend in farming practices towards increased mechanisation, the automatic bale wagon, such as the type illustrated in U.S. Pat. No. 3,610,442 and Canadian Pat. No. 902,003 has been gaining in acceptance as an essential farm implement. In these bale wagons, bales are loaded onto a first receiving table which sequentially moves two or more bales in end-to-end relaionship onto a second transfer table, whereupon a tier of bales is accumulated. When a full complement of bales for a tier has been loaded upon the second transfer table, the latter is elevated from a somewhat horizontal position to a substantial vertical position to dispose the tier of bales either against a rolling rack upon a load bed of the wagon or against the forward face of a previously deposited tier of bales. All operations of the various receiving and transfer tables, rolling rack and final unloading of the load bed are accomplished by hydraulic means and associated fluid circuits and control valves which are operated by appropriate cams, trip members and other means such as described in detail in the aforementioned patent specification.

After accumulating successive bale tiers to form a completed bale stack on the load bed, the bale stack may be transported to a desired location for discharge from the wagon in a composite stack. Bale wagons have now evolved to the point where not only can they pick up individual bales in the field and stack them or retrieve an entire stack, but they are also able automatically to unload the wagon one bale at a time.

Bale wagons of the types hereinbefore described are generally satisfactory when operating in generally flat fields. However, when using these bale wagons in hilly conditions, certain problems are encountered.

When the bale wagon is operated on a downward incline, it has been found that the bale tiers on the load bed tend to fall forwards or take up a curved profile. One solution to this problem has been to leave the transfer table in the upper position after completing the loading of bales on the wagon and whilst the wagon is driven to the desired discharge location. This solution, however, solves only part of the problem since it is necessary to keep the transfer table in its generally horizontal position during the loading operation to accumulate bale layers. Therefore, any previously-loaded bale tiers which tend to fall forwards create an irregular or lossely piled stack which is unacceptable. The tendency for bales to fall backwards when the wagon is operating downhill equally occurs between the second and first table. Similar problems occur during abrupt braking of the wagon.

It is the primary object of the present invention to overcome or attenuate the problem of bales on the load bed becoming disarranged.

According to the present invention a bale wagon comprises a bale transfer table movable between a bale-receiving position and a bale-unloading position in which latter position bales are transferred to a load bed to form a stack of bales comprising a plurality of tiers of bales, retractable bale-retaining means operable to retain the forwardmost tier of bales in position on the load bed and control means operable to automatically retract the bale retaining means when a further tier of bales is transferred to the load bed from the transfer table.

The bale-retainer means may be in the form of a plurality of pivotable tines or fingers engageable with top bales of the front tier under a positive contact pressure. The tines may be spring loaded and movable to an inoperative position against the spring force by means, such as a cam for example, associated with the transfer table. The tines are moved to the inoperative position when a further tier of bales is to be transferred to the load bed from the transfer table or when a stack of bales on the load bed is to be unloaded, either en bloc or bale-by-bale, from the wagon. In an alternative arrangement, the contact pressure of the tines and the retraction of the tines is controlled by a hydraulic actuator.

In still another arrangement and according to another aspect of the invention, the bale-retaining means are pivotally mounted in front of the front tier of bales on the load bed so as to be engageable with the front face of said tier in an operative position and being retractable to an inoperative position clear of said front face to permit the transfer of a further tier of bales to the load bed from the transfer table or to permit unloading of the load bed.

The bale-retaining means may comprise bale-retaining members in the form of two generally vertical side arms interconnected by a transverse arm, the side arms being pivotally mounted and attached to one end of a link the other end of which is operatively connected to the transfer table such that when the transfer table is moved towards the load bed, the side and transverse arms are pivoted clear of the front face of the front tier of bales to the inoperative position.

Still other bale-retaining members may comprise two generally transversely-extending arms pivotally mounted at respective sides of the wagon for pivotal movement between operative and inoperative positions in a transverse plane.

Each transverse arm may be spring loaded to the operative position and have a cranked end operatively associated with the transfer table such that when the latter moves towards the load bed, the transverse arm is moved to the inoperative position. The cranked end of each transverse arm may be connected by a cable to a first lever connected to a rock shaft which also has connected thereto a second lever in engagement with a cam attached to the transfer table, the arrangement being such that when the transfer table is moved towards the load bed the cam is rotated whereby the second lever is moved and rotates the rock shaft and first lever, the latter pulling on the cable to pivot the transverse arm from the operative position to the inoperative position.

Figure 2:
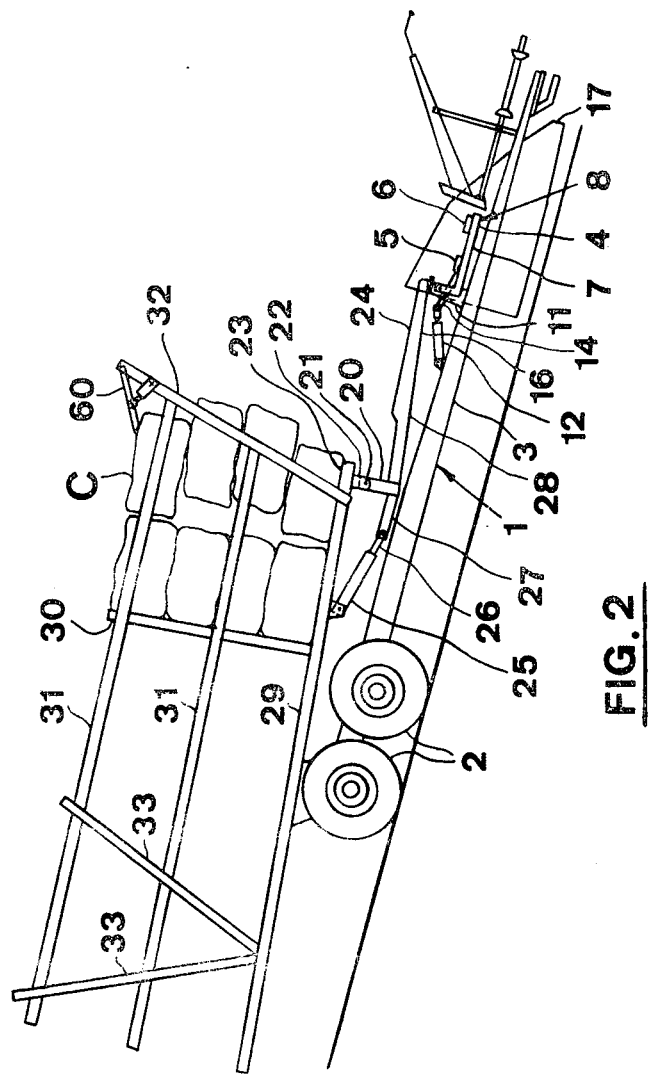
Figure 3:
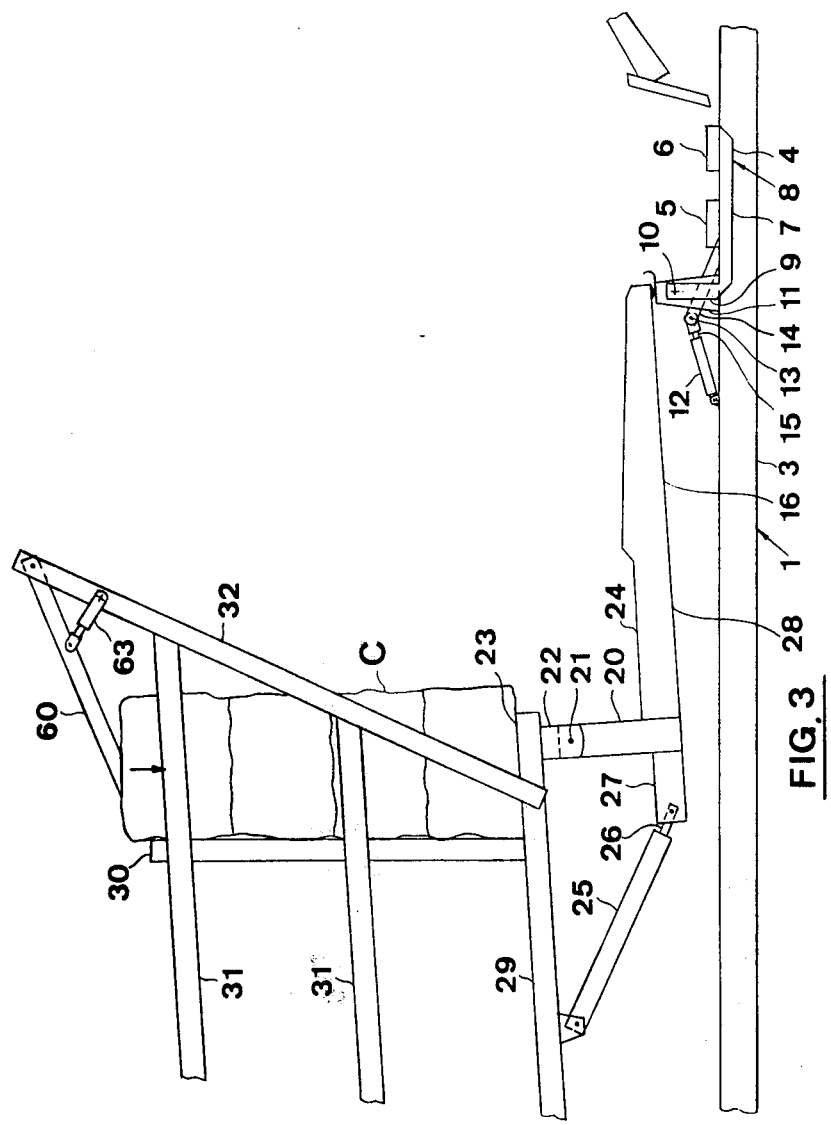
Figure 4:
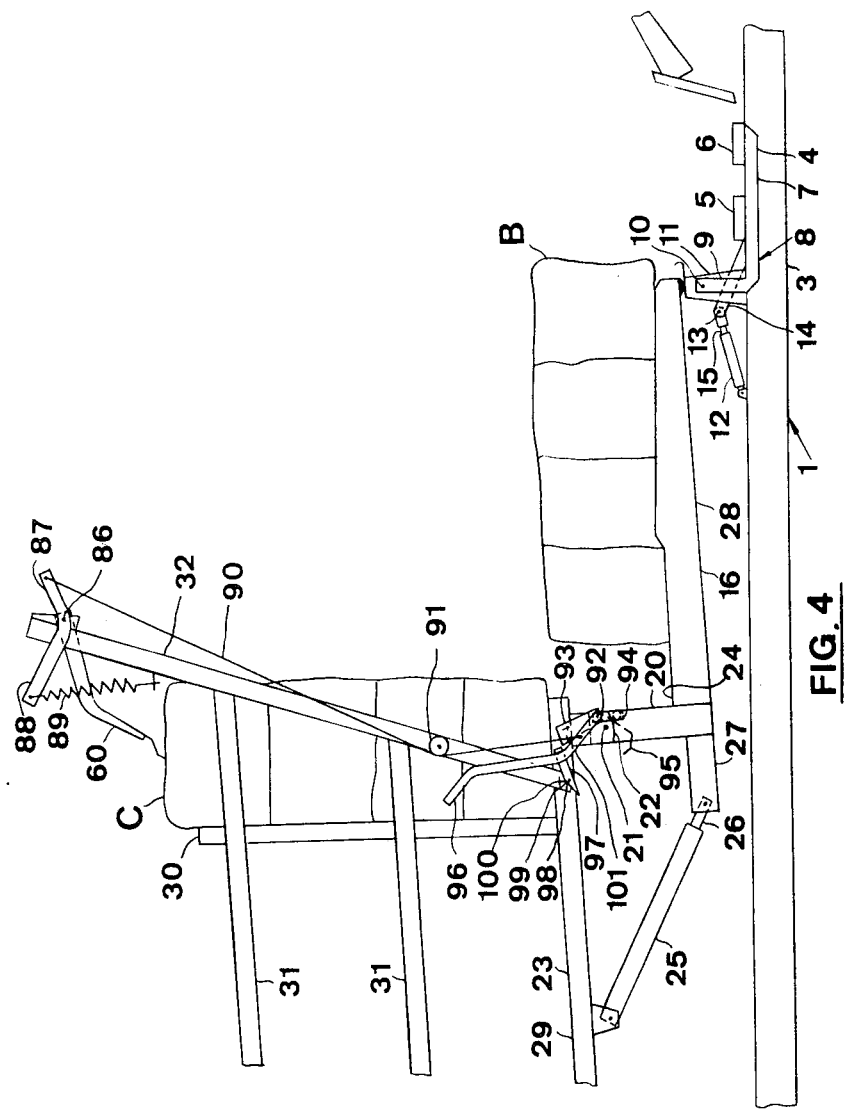
Figure 5:
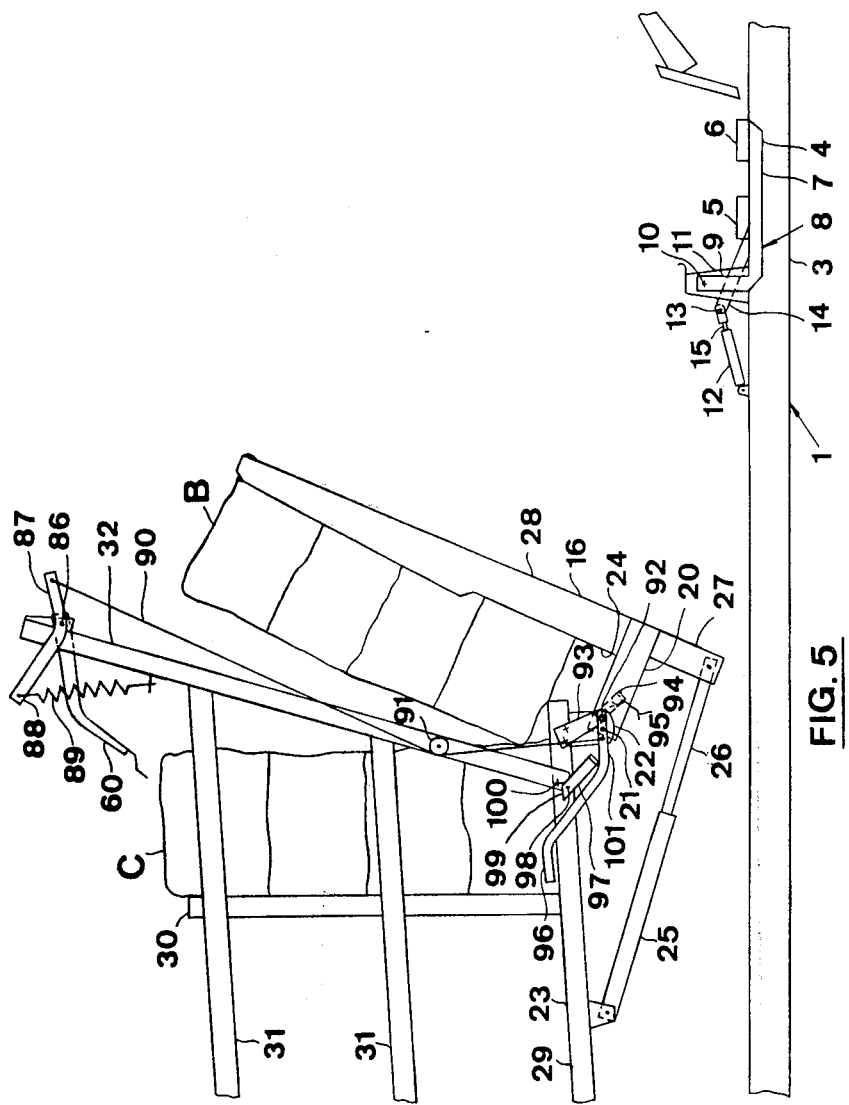
Figure 6:
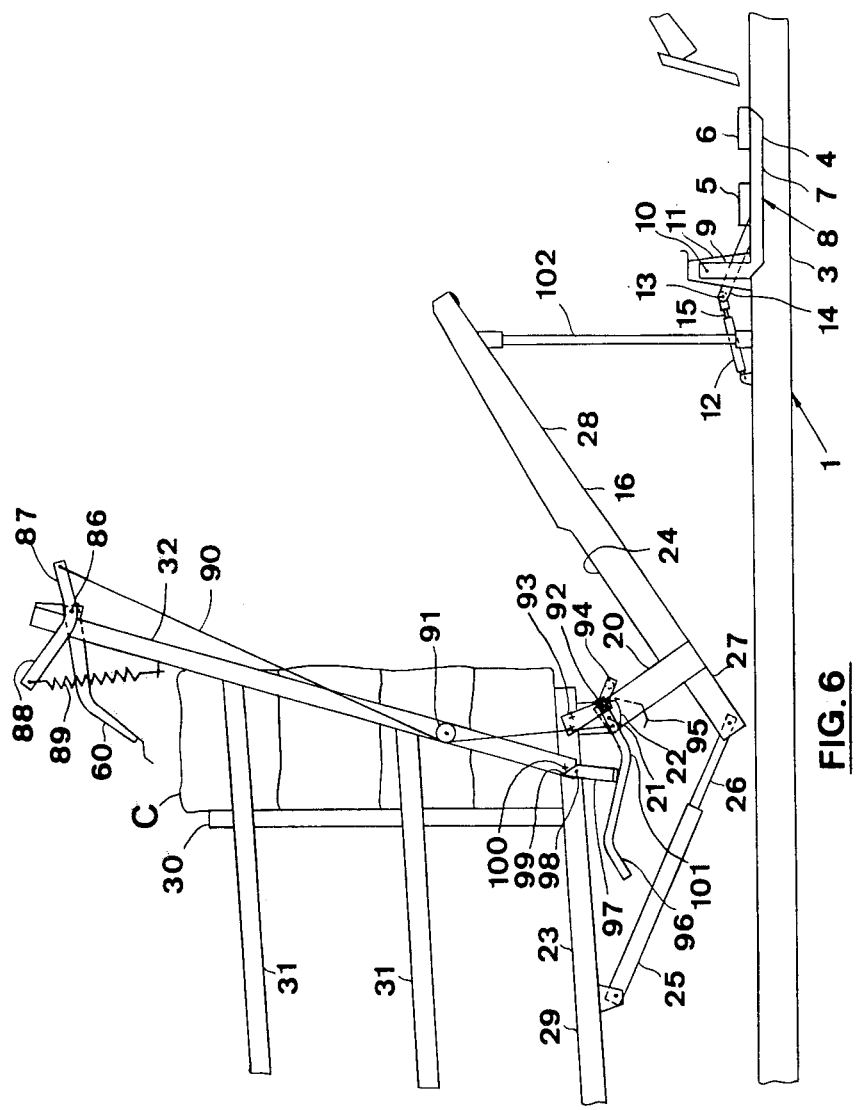

Bale wagons embodying the present invention will now be described in greater detail, by way of example, with reference to the accompanying drawings in which:

FIG. 1 is a side elevation of one bale wagon,

FIG. 2 is a side elevation illustrating a problem which may occur when a conventional bale wagon is operating on a downward incline, FIG. 3 is a partial view, to a larger scale, of FIG. 1 with certain parts added and others removed, showing a solution to the problem illustrated in FIG. 5, FIG. 4 is a view similar to FIG. 3 but showing another embodiment of the invention, and FIGS. 5 and 6 are views similar to FIG. 4 with the components in different operative positions.

Figure 7:
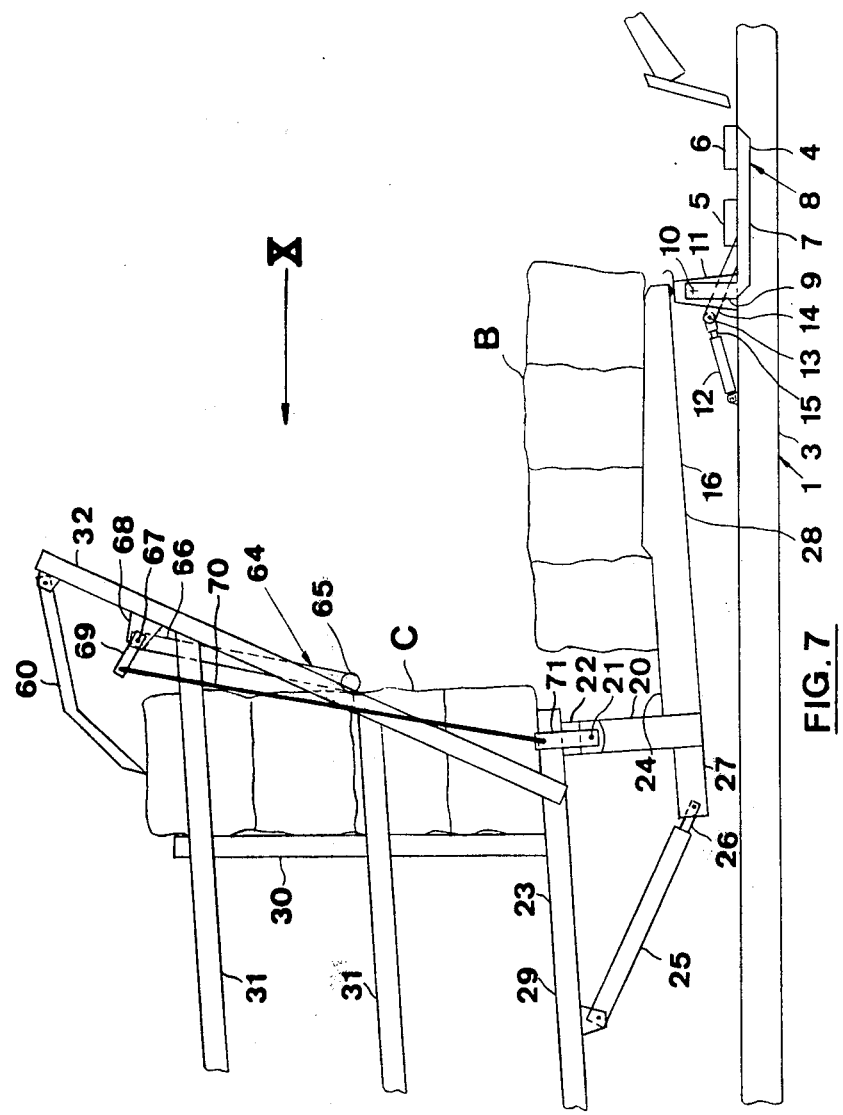
Figure 8:
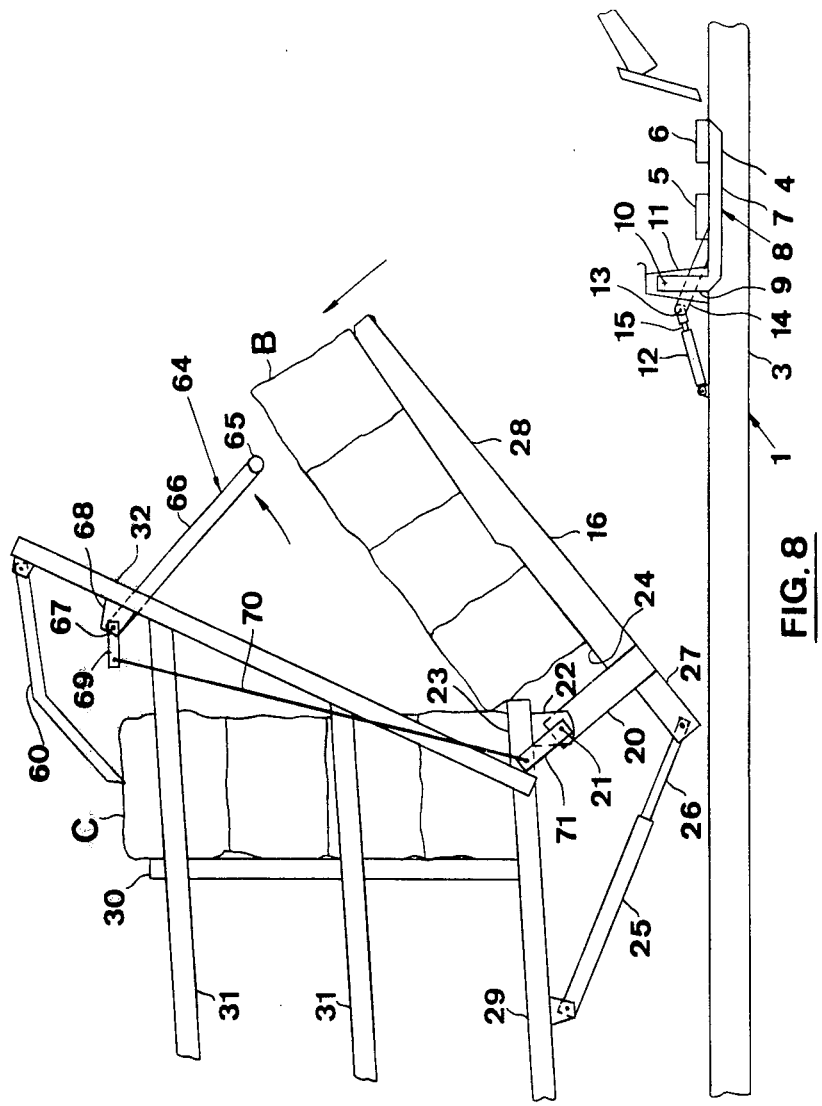
Figure 9:
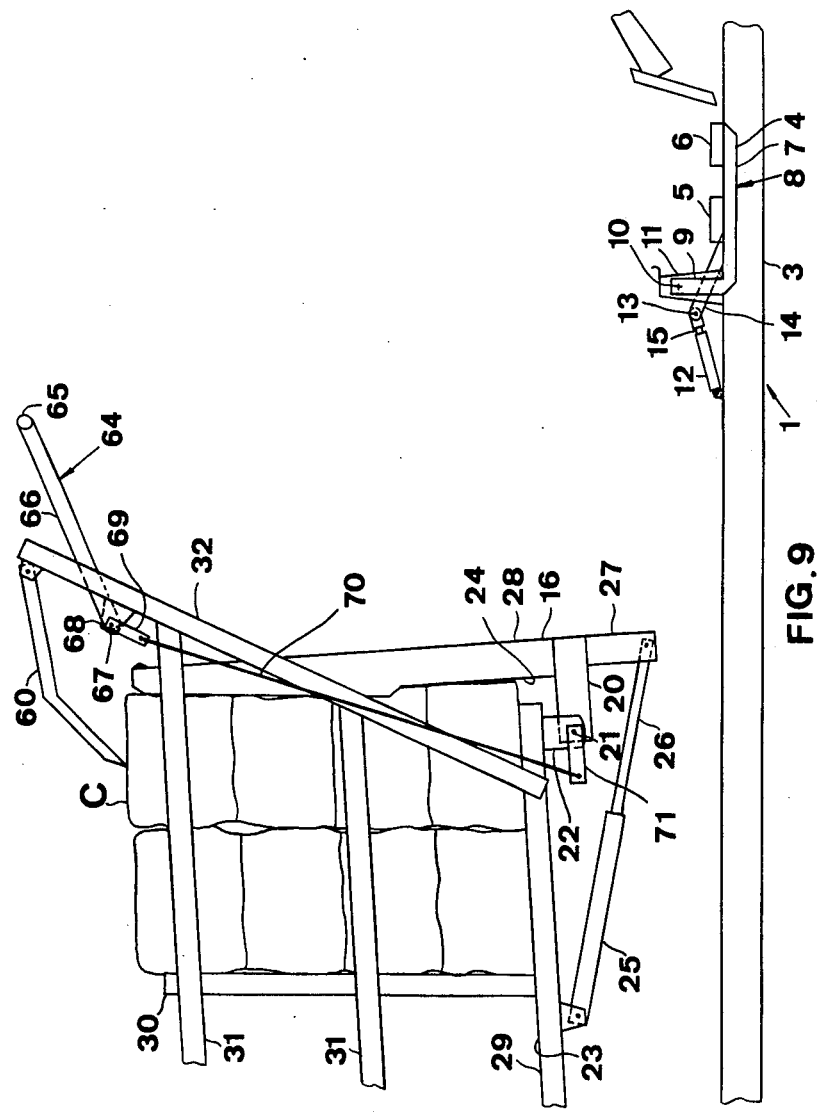
Figure 10:
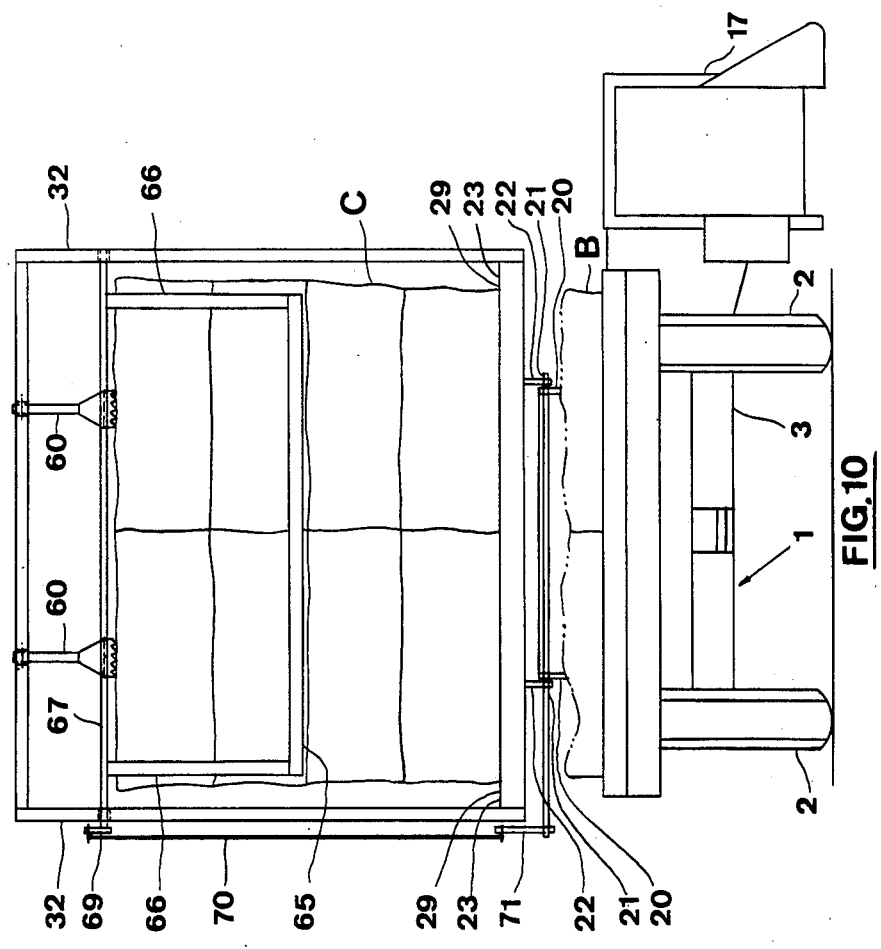

FIG. 7 is a view similar to that of FIG. 3 but showing still another solution to the problem illustrated in FIG. 2, FIGS. 8 and 9 are views similar to FIG. 7 with the components in different operative positions, FIG. 10 is a view taken in the direction of arrow X on FIG. 7.

Figure 11:
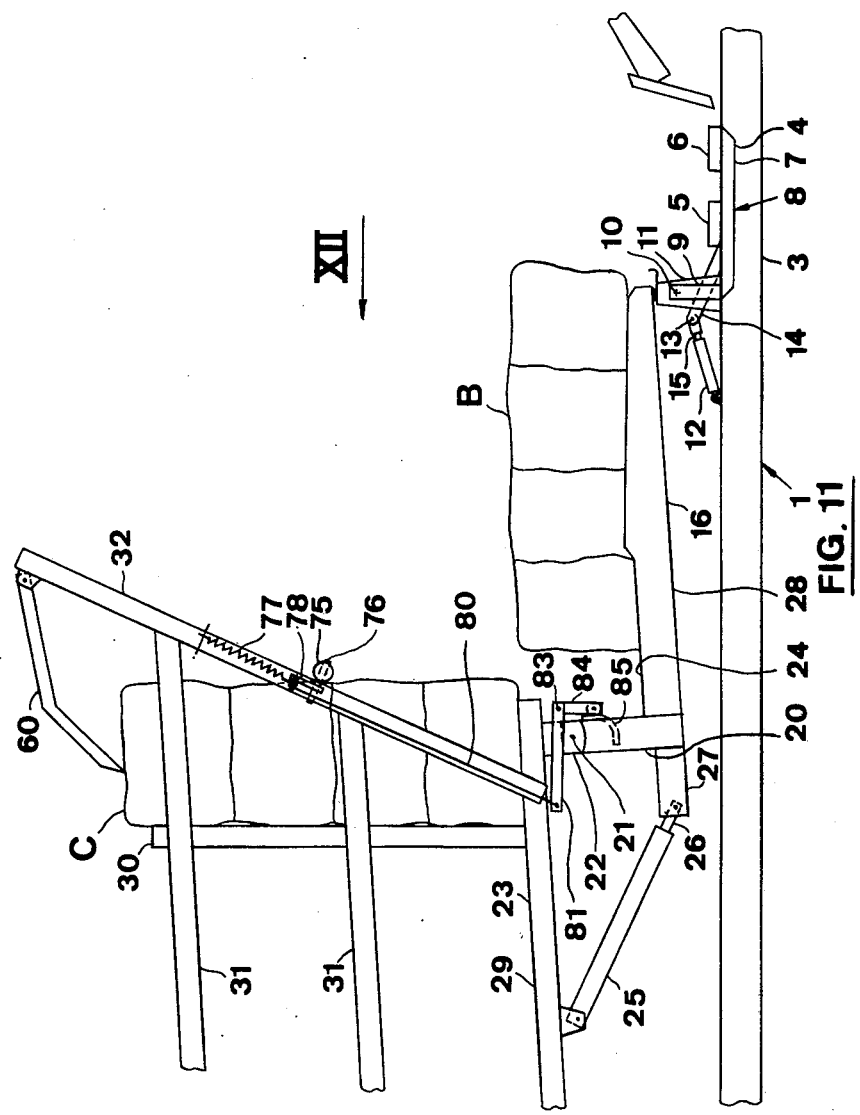
Figure 12:
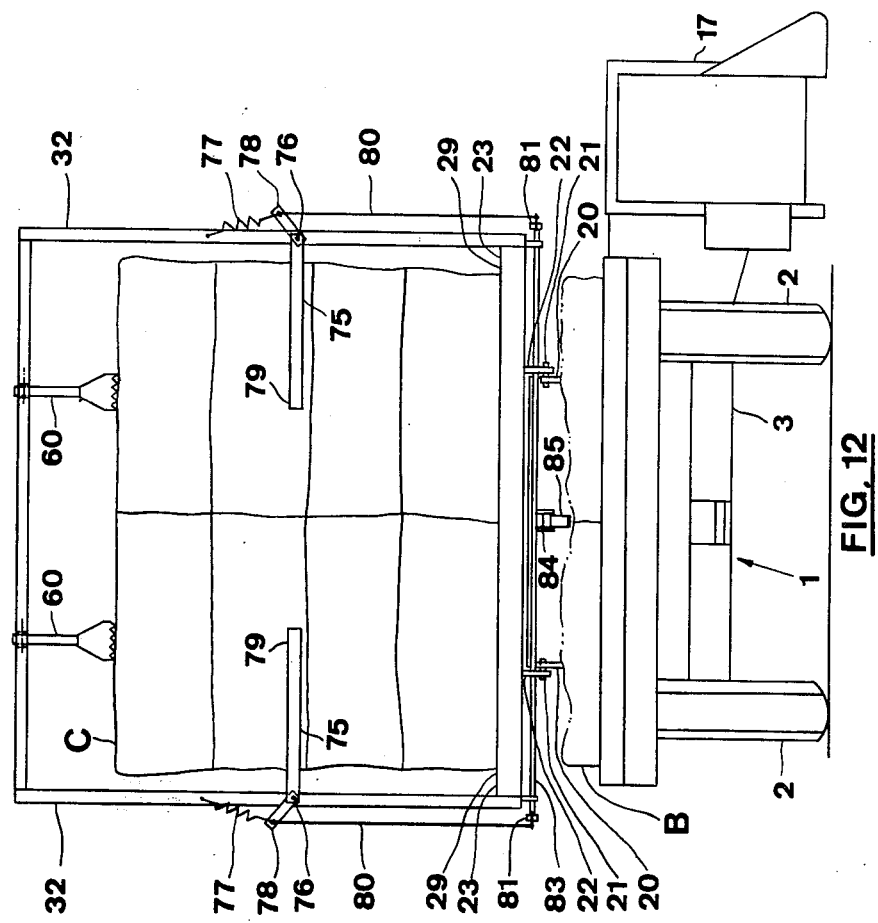
Figure 13:
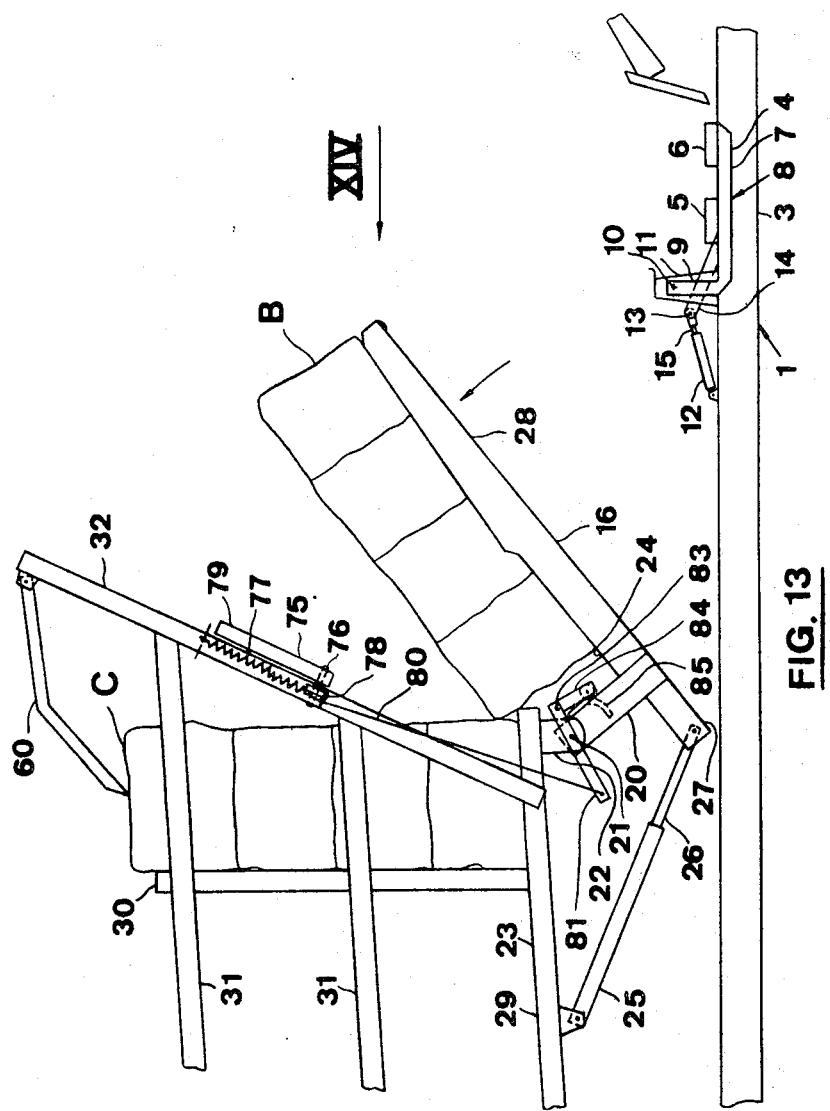
Figure 14:
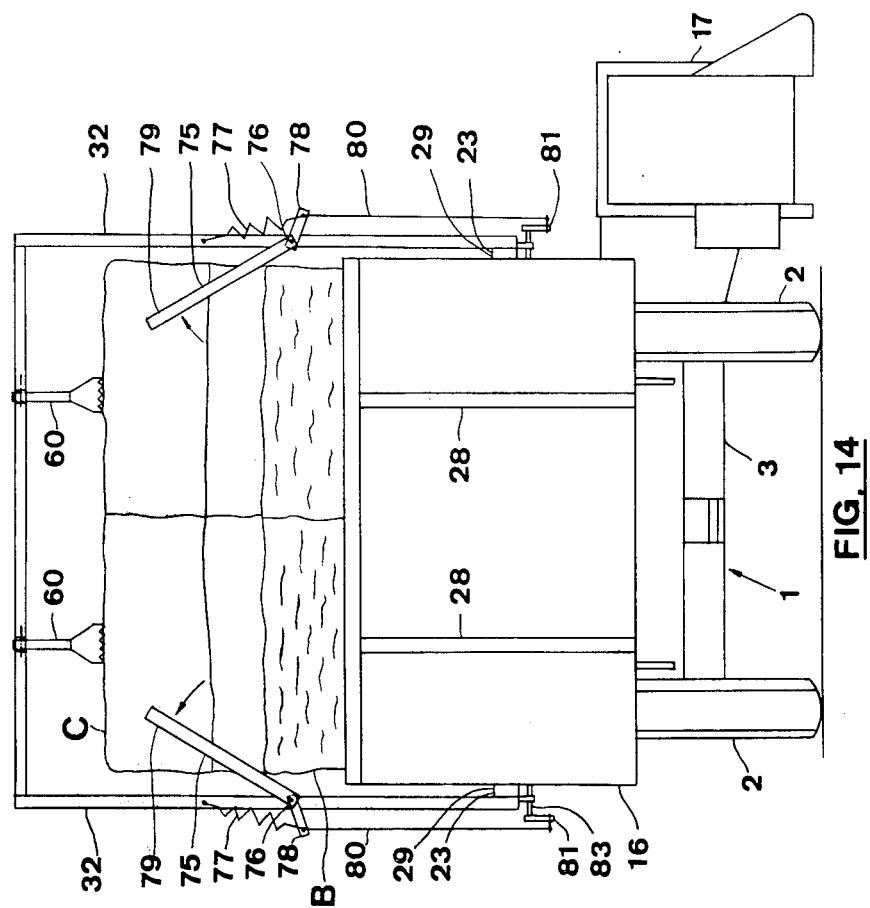
Figure 15:
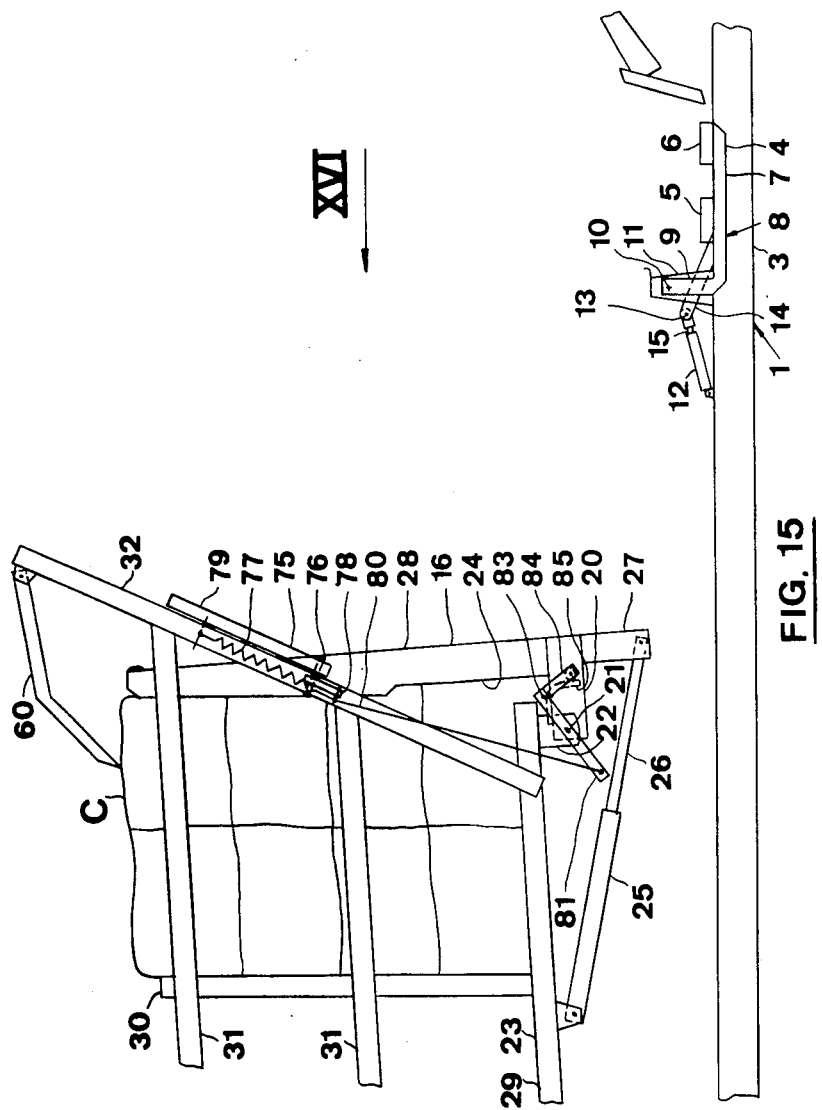

FIG. 11 is a view similar to that of FIG. 3 but showing a different solution to the problem illustrated in FIG. 2, FIG. 12 is a view taken in the direction of arrow XII of FIG. 11, FIGS. 13 and 15 are views similar to FIG. 11 but with the components in different operative positions, and FIGS. 14 and 16 are views taken in the direction of arrows XIV and XVI in FIGS. 13 and 15, respectively.

The basic features of the bale wagons to be described are set forth hereinafter to an extent sufficient for the present invention to be appreciated and understood. However, certain components, in particular the hydraulic system by which the various elements of the bale wagon are activated and controlled, are shown only diagrammatically. Operation of certain of these elements, especially the control valves for the hydraulic cylinder units, is initiated by certain trip mechanisms, cams, etc., the details of which are not shown in the drawings of the present application but are illustrated and described in U.S. Pat. No. 3,610,442 and Canadian Pat. No. 902,003 to which attention is directed for a more complete description and illustration of the same.

Referring to the accompanying drawings and particularly to FIG. 1, the bale wagon comprises a chassis, indicated generally at 1, mounted on two pairs of wheels, only the right hand ones 2 being seen in FIG. 1. The chassis 1 is formed of left- and right-hand, longitudinally-extending rails 3 of which only one is seen. Although it is not specifically shown, the forward ends of the longitudinally extending rails 3 converge in a clevis assembly which adapts the wagon to be secured to a tractor (not shown), or other towing vehicle, located at the front thereof. Power for the wagon is obtained from the tractor power-take-off in a conventional manner, but not specifically shown.

Mounted at the forward end of the chassis 1 and extending transversely thereof is a first load or receiving table 4 comprising two transversely-extending beams 5 and 6 which are mounted on a forwardly-extending horizontal portion 7 of an L-shaped structure indicated generally at 8. The L-shaped structure 8 includes a rear, upwardly-extending leg portion 9 which is pivotally secured at 10 to spaced brackets 11, only one of which is shown, mounted on the right- and left-hand side rail 3. A hydraulic actuator 12 is pivotally secured by a pivot pin to the framework of the bale wagon. The rod 15 of the cylinder 12 is pivotally secured at 13 to an arm 14 which is welded, or otherwise secured, to the L-shaped member 8 of the receiving table 4. As the actuator 12 is extended, the receiving table 4 is swung upwardly about its pivot point 10, thereby transferring any bales which have been accumulated on the table (such as bales A) onto a second, or transfer table 16.

It will be understood by those skilled in the art that the bales A are first introduced to the receiving table 4 by means of a pick-up 17 which lifts bales from the ground and directs them to the receiving table 4.

The transfer table 16 is also mounted on a pair of L-shaped structures 28, each having a forwardly-extending leg portion and an upwardly-extending rear leg portion 20 which is disposed at right angles to the lower leg portion. Each of the upwardly-extending leg portions 20 is secured by a pivot pin 21 to a depending lug 22 mounted on the forward end of a load bed 23. A bed surface 24 of the transfer table 16 is formed across the forwardly-extending leg portions and provides a surface upon which bale tiers are formed. When the transfer table 16 is in its normal tier-forming position, it is disposed in the position shown in FIG. 1. A hydraulic actuator 25 is secured by a pivot pin to the load bed 23, with the rod end 26 of the actuator pivotally connected by a pivot pin to a rearwardly-extending member 27 fixed by its forward end to the rear portion of the L-shaped structure 28. The load bed 23 includes a platform assembly 29.

When the requisite number of bales has been accumulated on table 16 from the table 4, to form a first tier of bales thereon, the hydraulic actuator 25 is operated by trip means (not shown) so that it extends and causes the table 16 to swing upwardly about its pivot pin 21 through approximately 90°. In this manner, the first bale tier formed on the transfer table 16 is transferred from a generally horizontal position on the table 16 to a generally vertical position on a rearwardly-disposed bed or load table 23 against a rolling rack 30 which is thus forced rearwardly. Successive tiers of bales placed on the load bed 23 by the table 16 will effect further rearward movement of the rack 30 relative to the load bed 23. The bale tiers ae laterally confined on the load bed 23 by right- and left-hand side bars 31, only the right hand side shield being shown in FIG. 1. Each of the side bars 31 is supported by upwardly-extending front and rear struts 32, 33 respectively.

The rolling rack 30 is adapted to be advanced forwardly and rearwardly by means of a cable system (not shown). When the operator of the bale wagon desires to unload the wagon one bale at a time, the bale tier last deposited on the load bed 23 is transferred back to the now inclined table 16 by forward movement of the rolling rack 23. A cross conveyor (not shown) engages the end bale of the lowermost layer of bales and discharges it from the bale wagon. Bale engaging means (not shown) have previously engaged the layer of bales next to the lowermost layer on the transfer table and shifted them upwardly on the bed surface 24 to permit ready discharge of the lowermost layer. When the lowermost layer has been discharged, the bale engaging means are retracted to allow the previously retained layer to fall and become the lowermost layer for discharge, the bale engaging means then engaging and lifting the next layer. This operation is repeated until the whole tier has been discharged, whereupon the rolling rack is moved further forward to transfer the next tier onto the table 16.

With reference to FIGS. 2 to 16, the problems associated with the bales loaded on the load bed 23 when the wagon is operated on a downward incline, and solutions thereto, will be described in further detail.

Known bale wagons have been provided with rearwardly-projecting bale retaining fingers 60 pivotally mounted to a transverse member extending between the upper ends of the struts 32. These retaining fingers 60 rest merely under their own weight on the top bales on a front tier C of bales deposited on the load bed 23 and FIG. 2 illustrates what can happen with this tier when the wagon is operating on a downward incline. The intermediate layer or layers of bales of the front tier may slide forwardly and form an irregular tier. If the loading operating is continued with tier C in the condition illustrated in FIG. 2, a loose, irregular and unsatisfactory stack of bales is likely to result. The problem is even worse when the front tier falls back on to the transfer table 16 because the operation of the wagon is then interrupted and the operator has manually to unload and then reload the tier. Thus the automatic operation of the wagon is severely hampered.

One solution to the problem is shown in FIGS. 1 and 3 in which a hydraulic actuator 63 is provided between the struts 32 and the bale retaining fingers 60. When the actuator 63 is retracted, the contact pressure of the fingers 60 on the top bales of tier C is increased so that the tier is retained firmly in position even when the wagon is operating on downward slopes. Means are provided for the increased bale contact pressure of the fingers to be released when the transfer table 16 is transferring another tier to the load bed 23 since the previously loaded tiers have to move rearwardly with the load rack 30 to accommodate the new tier. Also this pressure has to be released when the wagon is unloaded either bale-by bale or in a stack.

An alternative arrangement is shown in FIGS. 4 to 6 in which the bale tier retaining fingers 60 are of an aggressive shape and action. The fingers 60 are secured to left- and right-hand rock shafts 86 mounted near the top of the struts 32 on inner brackets provided on a transverse beam connecting the top ends of the side struts 32. Forwardly and rearwardly projecting arms 87 and 88, respectively, are rigidly mounted on each rock shaft 86. A spring 89 extends between the free end of each arm 88 and the associated strut 32 and urges the tier retaining fingers 60 in a downward direction.

A cable 90 is coupled at the free end of each arm 87 and extends downwardly via a pulley 91 to a lever 101 which itself is fixedly secured to a transverse rock shaft 92. The rock shaft 92 is mounted in brackets 93 on the forward end of the load bed 23 and has at an intermediate section a lever 94, which is in engagement with a cam 95 on the transfer table 16. The right-hand lever 101 is extended to form a handle 96. A stop 97 is pivotally mounted at 98 and in one mode of operation of the wagon is arranged to hold the handle 96 in its lowermost position as seen in FIG. 6. The stop 97 has an abutment end 99 which can engage another stop 100 on the side of the load bed 23. The springs 89 urge the tier-retaining fingers 60 with a considerable force into the upper layer of the bales of the front tier C when the transfer table 16 is in its lowermost position and the handle 96 is in its raised position (FIG. 4). Thus the front tier C is kept firmly in position and no bales tend to slide forwardly even when the wagon is operating downhill. When the table 16 is raised to deposit a new tier on the load bed 23, the cam 95 is rotated and causes the lever 94 to rotate the rock shaft 92. This results in the levers 101 pulling the respective cables 90 and hence raising the associated fingers 60 to release the front tier C, so that the new tier ca be deposited on the load bed. FIG. 5 shows the transfer table 16 in an almost completely raised position and hence the tier retaining fingers in their released position. It will also be seen from FIG. 5 that in this mode of operation the stop 97 is not operative with respect to the handle 96.

During the unloading mode of the bale wagon, the transfer table 16 is inclined by means 102 as shown in FIG. 6. In this mode, the fingers 60 have to be released as the bales are to be unloaded and since they are not fully retracted by the inclined position of the table 16, the operator pulls down the handle 96 to an extent that the stop 97 can pivot to its operative position under its own weight in which it holds the handle in its lowermost position and hence the fingers 60 in the retracted position. Thereafter unloading can start and when finished, the stop 97 can be released maually and all other components returned to their initial positions.

A further arrangement according to the invention is shown in FIGS. 7 to 10 in which the known bale retaining fingers 60 are retained. In addition thereto, a pivotally mounted bale-retaining member 64 comprising side arms 66 is arranged to engage the front face of the front tier C around the central area thereof when the transfer table 16 is in its normal lowered bale-receiving position as seen in FIG. 7. The tier retaining arms 66 are interconnected by a lower transverse arm 65 and are pivotally mounted at 67 to respective brackets 68 secured to the struts 32. The retaining member 64 is fixedly attached to a link 69 to which is attached one end of a rod 70, the other end of which is coupled to an arm 71. Arm 71 is attached to the transfer table 16 and is arranged to pivot therewith.

The arm 71 pulls on the rod 70 when the second table 16 is raised and thus causes the tier retaining arms 66 and transverse arm 65 to pivot in a direction away from the tier C as shown in FIGS. 8 and 9 to permit the transfer table 16 to swing upwardly and deposit a new tier of bales on the load bed 23. As the table 16 is lowered following deposition of the new tier on the load bed, the arms 66 and 65 are swung back towards the new front tier C and engage and retain the latter when the table 16 reaches the bale-receiving position.

With reference to FIGS. 11 to 16, still a further embodiment of the invention is shown in which the tier-retaining member 64 of FIGS. 7 to 10 is replaced by a pair of tier-retaining arms 75 pivotally mounted at 76 on respective side struts 32 such that the arms can pivot in the plane defined by the struts. Springs 77 are connected between cranked ends 78 of the respective arms 75 and the associated struts 32 such that the other ends 79 of the arms are urged downwardly.

Cables 80 extend between the ends 78 of the arms 75 and legs 81 secured to a transverse rock shaft 83. The transverse shaft 83 is pivotally mounted on the lower end of the load bed 23 and has a single arm 84 attached thereto which is in engagement with a cam 85 associated with the transfer table 16. As already mentioned, the springs 77 urge the ends 79 of the arms 75 in a downwardly position, as best appreciated in FIG. 12, thereby tensioning the cables 80 when the transfer table 16 is in its normal, lowermost position. When the table 16 is raised, the cam 85 is rotated and causes the shaft 83 to rotate, whereby the legs 81 pull the cables 80 downwards. This movement of the cables 80 raises the arms 75 about the pivots 76 so that the arms clear the front tier C and permit a new front tier to be transferred from the table 16. When the table 16 is lowered after depositing the new tier on the load bed 23, the cam 85 is rotated in the opposite direction and the pull on the cables 80 is thus relaxed although tension is retained by the springs 77 which return the arms 75 to the bale-retaining position of FIG. 12. It will be seen that the FIGS. 13 and 14 show the table 16 and arms 75 in intermediate positions, and FIGS. 15 and 16 show these components in the fully raised position.

Each column of bales in a tier has a finger 60 associated therewith and this is the usual arrangement although more than one finger per column may be provided if desired.

From what preceeds, it will be appreciated that an automatic bale wagon according to the invention can be utilized in circumstances wherein the use of conventional automatic bale wagons is practically impossible or wherein the operation thereof is affected considerably. In other words the problems which otherwise commonly are encountered when operating with an automatic bale wagon on downward inclines in the direction of the longitudinal axis of the wagon, are avoided or at least attenuated to a great extent.

It is thought that the improvement provided by the present invention and many of its attendant advantages will be understood from the foregoing description and it will be apparent that various changes may be made in the form construction and arrangement of the parts thereof without departing from the spirit and scope of the invention or sacrificing all of its material advantages, the forms hereinbefore described being merely exemplary embodiments thereof.

Other aspects of an automatic hillside bale wagon are described and illustrated in U.S. Pat. No. 4,095,701.

Having thus described the invention, what is claimed is:

1. An automatic bale wagon for hauling bales lying in a field comprising:
   a mobile chassis adapted for movement in a forward direction across the field;
   a bale pick-up means mounted on the chassis for picking up bales from the ground during movement of the bale wagon across the field;
   means on the chassis for receiving bales picked-up from the ground and for forming a tier of bales thereon;
   a load bed on the chassis for forming a stack of bales thereon comprising a plurality of tiers of bales, said tier forming means being movable beween a bale-receiving position and a bale-unloading position in which latter position a bale tier formed on said tier forming means is transferred to the load bed;
   bale-retaining means for releasably engaging the upper surface of the top bales of the front tier of bales and applying a positive biasing force thereon toward the load bed to hold said front tier in position, said bale retaining means being retractable clear of said front tier;
   resilient means for spring loading the bale retaining means to an operative position;
   a rock shaft for supporting the bale-retaining means;
   an arm attached at one end to the rock shaft and the other end thereof being operatively connected to the tier forming means for when the latter move towards the load bed rotating said arm and said rock shaft to pivot the bale-retaining means against the spring-loading to the retracted position; and
   means operable to automatically retract the bale retaining means for permitting the transfer of a further tier of bales to the load bed from the tier forming means.

2. The automatic bale wagon as recited in claim 1 wherein the bale-retaining means comprise tines engageable with the upper surface of the top bales of the front tier.

3. The automatic bale wagon as recited in claim 1 wherein the bale-retaining means are mounted on the chassis of the automatic bale wagon.

4. The automatic bale wagon as recited in claim 1 wherein the bale-retaining means are mounted on the load bed of the automatic bale wagon.

5. An automatic bale wagon for hauling bales lying in a field comprising;
   a mobile chassis adapted for movement in a forward direction across the field;
   a bale pick-up means mounted on the chassis for picking up bales from the ground during movement of the bale wagon across the field;
   means on the chassis for receiving bales picked-up from the ground and for forming a tier of bales thereon;
   a load bed on the chassis for forming a stack of bales thereon comprising a plurality of tiers of bales, said tier forming means being movable between a bale-receiving position and a bale-unloading position in which latter position a bale tier formed on said tier forming means is transferred to the load bed; means for releasably engaging the front tier of bales on the load bed and retaining said front tier in position and being retractable clear of said front tier;
   resilient means for spring loading the bale retaining means to an operative position;
   cam means on the tier forming means; and
   linkage means extending between the cam means and the tier forming means; the cam means engaging with the linkage means when the tier forming means move towards the load bed for automatically retracting the bale retaining means against the spring loading to the retracted position for permitting the transfer of a further tier of bales to the load bed from the tier forming means.

6. The automatic bale wagon as recited in claim 5 wherein the linkage means comprise:
   a first rock shaft on the load bed for supporting the bale-retaining means;
   an arm of which one end is attached to the first rock shaft;
   a second rock shaft on the load bed;
   a first lever on the second rock shaft;
   coupling means for operatively connecting the first lever to the other end of said arm on the first rock shaft;
   a second lever on the second rock shaft for engaging said cam means; the cam means being movable with the tier forming means for rotating the second lever, the second rock shaft and the first lever thereon, the latter pulling on the coupling means to rotate said arm and the first rock shaft to pivot the bale retaining means to said retracted position.

7. The automatic bale wagon as recited in claim 6 further comprising an extension to the first lever for forming a handle for enabling to move the first lever manually to a position in which the bale retaining means are moved to the retracted position.

8. The automatic bale wagon as recited in claim 7 further comprising stop means for retaining the handle in the position in which the bale retaining means are rendered inoperative.

9. An automatic bale wagon for hauling bales lying in a field comprising:
   a mobile chassis adapted for movement in a forward direction across the field;
   a bale pick-up means mounted on the chassis for picking up bales from the ground during movement of the bale wagon across the field;

means on the chassis for receiving bales picked-up from the ground and for forming a tier of bales thereon;

a load bed on the chassis for forming a stack of bales thereon comprising a plurality of tiers of bales; said tier forming means being movable between a bale-receiving position and a bale-unloading position in which latter position a bale tier formed on said tier forming means is transferred to the load bed; and means movably mounted on the load bed and in front of the front tier of bales on the load bed for releasably engaging with the front face of the front tier in a operative position for retaining said front tier in position, and being retractable to an inoperative position clear of said front face to permit the transfer of a further tier of bales to the load bed from the tier forming means or to permit unloading of the load bed, said bale-retaining means including a generally transversely-extending arm pivotally mounted at a side of the wagon for pivotal movement between the operative and inoperative positions in a transverse plane.

10. The automatic bale wagon as recited in claim 9 further comprising:

a link attached at one end to the bale-retaining means;

a lever attached at one end to the tier forming means; and connecting means operatively interconnecting the other ends of the link and the lever for, when the tier forming means are moved towards the load bed, the lever to act on the connecting means to pivot the bale-retaining means to the inoperative position and for when the tier forming means are in the bale receiving position to hold the bale retaining means in the operative position.

11. The bale wagon as recited in claim 9 wherein the bale-retaining means are engageable with a central position of the front face of the front tier.

12. An automatic bale wagon for hauling bales lying in a field comprising:

a mobile chassis adapted for movement in a forward direction across the field;

a bale pick-up means mounted on the chassis for picking up bales from the ground during movement of the bale wagon across the field;

means on the chassis for receiving bales picked-up from the ground and for forming a tier of bales thereon;

a load bed on the chassis for forming a stack of bales thereon comprising a plurality of tiers of bales; paid tier forming means being movable between a bale, receiving position and a bale-unloading position in which latter position a bale tier formed on said tier forming means is transferred to the load bed;

means movably mounted on the load bed and in front of the front tier of bales on the load bed for releasably engaging with the front face of the front tier in an operative position for retaining said front tier in position, and being retractable to an inoperative position clear of said front face to permit the transfer of a further tier of bales to the load bed from the tier forming means or to permit unloading of the load bed, said bale-retaining means including:

arms pivotally mounted at the sides of the wagon for pivotal movement between the operative and inoperative positions in a transverse plane;

resilient means for resiliently loading the arms to the operative positions;

a transverse rock shaft on the load bed;

first levers connected at one end to the opposite ends of the rock shaft;

connecting means operatively coupling the other ends of the first levers to the respective associated arms;

a second lever on the rock shaft, and cam means on the tier forming means for moving together therewith and for upon movement of the tier forming means from the bale-receiving position to the bale-unloading position engaging the second lever and rotating the latter together with the rock shaft and the first levers thereon, the latter acting on the connecting means to pivot the arms against the resilient loading from the operative position to the inoperative position.

* * * * *